Dec. 9, 1924.
C. R. GRIFFITH
CONFECTION AND METHOD OF MAKING SAME
Filed Dec. 5, 1923
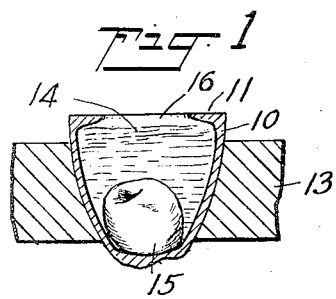
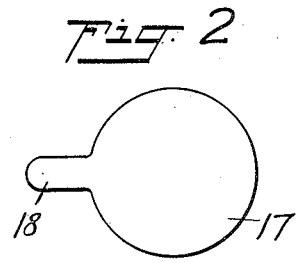
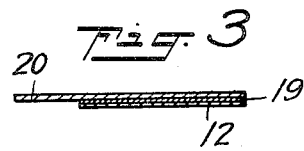
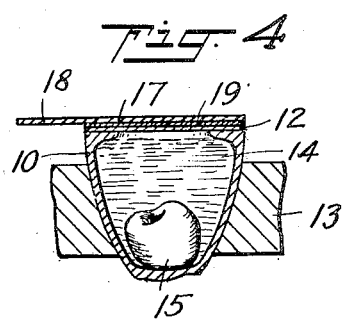
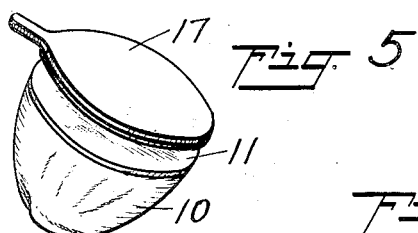
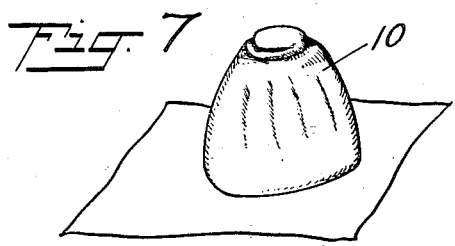
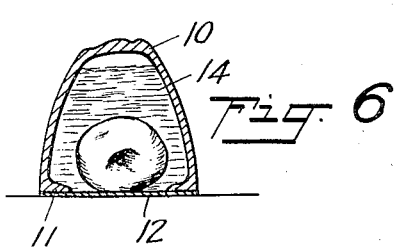
INVENTOR
Charles R. Griffith
BY
Harry Jacobson
ATTORNEY Patented Dec. 9, 1924.

1,518,737

UNITED STATES PATENT OFFICE.

CHARLES R. GRIFFITH, OF NEW YORK, N. Y.

CONFECTION AND METHOD OF MAKING SAME.

Application filed December 5, 1923. Serial No. 678,720.

*To all whom it may concern:*

Be it known that I, CHARLES R. GRIFFITH, a citizen of the United States, residing at the city of New York, in the county and State of New York, have invented certain new and useful Improvements in Confections and Methods of Making Same, of which the following is a specification.

This invention relates to confections and particularly to that type designed to have a center of any desired consistency.

It is one of the objects of my invention to provide a chocolate confection, wherein the inside is hollow, and filled with such a confection of liquid, semi-liquid or viscous form as is ordinarily impossible to handle or to cover with chocolate separately by means of the usual processes.

A further object of my invention is the provision of an economical, rapid and efficient method of sealing the open end of a chocolate shell, into which a center of any material and consistency has been inserted.

For the attainment of the aforesaid and other objects as will appear hereinafter, reference is to be had to the accompanying drawings, in which, Fig. 1 is a vertical section of the preferred form of my improved confection as it appears when filled and ready for sealing. Fig. 2 is a top plan view of the sealer used for sealing said confection. Fig. 3 is a vertical section of the same. Fig. 4 is a vertical section of the confection and of the sealer in sealing position. Fig. 5 is a perspective view of the sealed confection and of the sealer in the act of being removed from the said sealed confection. Fig. 6 is a vertical section of my improved confection, and Fig. 7 is a perspective view of the same.

In the manufacture of my improved confection, I provide preferably a chocolate shell 10 of a sufficient thickness throughout to allow easy handling. A suitable base 11 projects inwardly from the bottom of said shell. Sufficient area is provided on said base to provide a surface on which a sealing base as 12 may be caused to adhere firmly. Said preferred form of shell is the subject matter of a copending application for Letters Patent of the United States filed December 5, 1923, Serial No. 678,721, and need not here be described in detail. It will be noted, however, that the greatest thickness of chocolate in the shell 10 occurs substantially at the circumferential outer edge of the base of said shell.

During the filling and sealing operation said shell may be supported in any suitable manner as by means of the apertured board or table 13. Material such as liquid, or semi-liquid filling may then be inserted into said shell. My improved confection is equally adapted to hold a suitable syrup as 14 or a candy paste of any consistency whatsoever, cordial, fruits and the juices therefrom, jelly, jam, or any other suitable material, it being understood that any combination of liquid and other material may be used as a filler if desired.

For the purposes of illustration a cherry 15 and cherry syrup 14 is shown inserted into the shell 10 though it will be understood that fruit or confectionery of any character and nature may be used instead.

To seal the opening 16 in the shell 10, I prefer to use a preferably circular sealer 17, preferably having a tab 18 projecting therefrom, by means of which tab said sealer may be handled. The sealer 17 may be made of metal to which chocolate does not adhere when solidified or set, or of a suitable disk 19 of waxed or dipping paper attached to a cardboard portion 20 of said cover.

In order to form the sealing base 12 of my improved confection, the member 19 of the sealer 17 is dipped face downwardly into molten chocolate and then lifted from said chocolate. It will be understood that a certain amount of the chocolate will adhere to the member 19 (it being well known that molten chocolate will adhere to waxed paper in its molten state). The sealer 17 is then brought over to the shell 10 and placed with the chocolate covered face on the base portion 11 of said shell, whereby the molten chocolate in the sealer merges into and becomes integral with the base 11 of said shell. After the chocolate on said sealer 17 has hardened or set, said sealer is lifted off from the finished confection, as illustrated in Fig. 5.

It will be seen that since the molten chocolate base or cover 12 adheres firmly to and becomes substantially an integral part of the confection, that said confection may be reversed into the position shown in Figs. 6 and 7 without danger of any of the liquid contained in said confection leaking out.

It will also be understood that my improved confection may be made of any candy material having the characteristics of chocolate above described, though chocolate is the material with which my improved confection may best be made and my improved process best carried out.

What I claim is:—

1. The method of making a chocolate covered confection having substantially liquid contents consisting of the provision of a chocolate shell having a partly formed base thereon and open at the end, filling said shell with liquid through the open end, dipping a sealer of substantially the same size and shape as the periphery of the base of said shell into molten chocolate and placing said sealer with the chocolate thereon completely covering and substantially in registration with the open end of the filled shell.

2. The method of making a candy confection having substantially liquid contents consisting of sealing one end of a filled candy shell with a circular disc of molten candy and of substantially the same size as the periphery of said end of said shell.

3. The method of making a chocolate covered confection having substantially liquid contents, consisting of the provision of a filled chocolate shell having a partly formed base thereon and open at the top, and sealing said open end by placing thereon a sealer with a disc of molten chocolate adhering to the under side thereof, said disc being placed on said end substantially in registration therewith.

4. The method of making a chocolate covered confection having substantially liquid contents consisting of the provision of a chocolate shell having a partly formed base thereon and open at one end and of substantially the same thickness throughout, filling said shell through the open end thereof with the contents, dipping a sealer of substantially the same size and shape as the open end of said shell into molten chocolate, placing said sealer with the chocolate thereon covering and substantially in registration with the open end of the filled shell, and removing said sealer after the molten chocolate thereon has set.

5. The method of making an outside covering of chocolate and a center of any confectionery material consisting of the provision of a chocolate shell having a partly formed inwardly projecting base with an opening therein, supporting said shell with said opening uppermost, inserting the center into said shell through said opening, dipping a sealer of substantially the same shape and size as the periphery of the base of said confection into molten chocolate, placing said sealer with the molten chocolate on the under side thereof over the opening in said shell, allowing said molten chocolate to set, and removing said sealer.

6. In a chocolate shell, a substantially conical thin body portion of substantially the same thickness throughout, a flat circular partly formed base on said shell having a substantially central opening therein of less diameter than that of said body portion, at the juncture of said base and said body portion, and a fillet portion thicker than the remainder of said shell at said juncture.

7. In a chocolate shell, a thin body portion, a closed end on said body portion, and a partly formed base portion having an opening therein, integral with and disposed at the other end of said body portion, said opening being smaller than the inside diameter of said body portion measured at said base portion.

8. In a chocolate shell, a body portion, and a partly formed base portion having an opening therein, integral with said body portion, said opening being smaller than the inside diameter of said body portion measured at said base portion, and a fillet portion of greater thickness than the remainder of said body portion and said base, at the juncture of said base portion and said body portion.

9. In a chocolate shell, a body portion of substantially the same thickness throughout, and a flat partly formed base portion extending inwardly of said shell beyond the inner surface of said body portion and having a substantially central opening therein.

CHARLES R. GRIFFITH.